United States Patent
Scheer

[11] Patent Number: 6,012,881
[45] Date of Patent: Jan. 11, 2000

[54] DRILLING TOOL

[75] Inventor: Gerhard Scheer, Löechgau, Germany

[73] Assignee: Komet Praezisionswerkzeuge Robert Breuning GmbH, Besigheim, Germany

[21] Appl. No.: 08/913,388

[22] PCT Filed: Feb. 10, 1996

[86] PCT No.: PCT/EP96/00570

§ 371 Date: Aug. 27, 1997

§ 102(e) Date: Aug. 27, 1997

[87] PCT Pub. No.: WO96/27469

PCT Pub. Date: Sep. 12, 1996

[30] Foreign Application Priority Data

Mar. 3, 1995 [DE] Germany ............... 195 07 469

[51] Int. Cl.[7] .................................................. B23B 51/00
[52] U.S. Cl. ...................... 408/227; 408/59; 408/145; 408/226; 408/230; 408/233; 408/713
[58] Field of Search .................. 408/57, 59, 144, 408/145, 199, 226, 227, 230, 229, 233, 231, 713

[56] References Cited

U.S. PATENT DOCUMENTS

| | | | |
|---|---|---|---|
| 2,555,302 | 6/1951 | Cogsdill | 77/68 |
| 3,320,833 | 5/1967 | Andreasson | 77/68 |
| 3,548,688 | 12/1970 | Kuch | 408/230 |
| 4,728,231 | 3/1988 | Kunimori et al. | 408/230 |
| 5,399,051 | 3/1995 | Aken et al. | 408/230 |
| 5,836,726 | 11/1998 | Berglund et al. | 408/144 |

FOREIGN PATENT DOCUMENTS

| | | |
|---|---|---|
| 0 088 505 | 9/1983 | European Pat. Off. . |
| 0 132 149 | 1/1985 | European Pat. Off. . |
| 348 371 | 12/1989 | European Pat. Off. . |
| 74 31 108 | 12/1989 | European Pat. Off. . |
| 0 358 901 | 3/1990 | European Pat. Off. . |
| 2 200 077 | 4/1974 | France . |
| 2 295 810 | 7/1976 | France . |
| 367 010 | 1/1923 | Germany . |
| 446 198 | 6/1927 | Germany . |
| 502 385 | 6/1930 | Germany . |
| 2 246 965 | 4/1974 | Germany . |
| 31 08 438 | 9/1982 | Germany . |
| 37 09 878 | 10/1988 | Germany . |
| 37 30 378 | 3/1989 | Germany . |
| 43 01 261 | 7/1994 | Germany . |
| WO 96/11079 | 4/1996 | WIPO ..................... 408/230 |

*Primary Examiner*—Andrea L. Pitts
*Assistant Examiner*—Monica Smith
*Attorney, Agent, or Firm*—Flynn, Thiel, Boutell & Tanis, P.C.

[57] ABSTRACT

A drilling tool comprises a drill tip, a chip removal part which axially adjoins the drill tip, and a drill shank which is positioned at the end of the chip removal part. Two chip flutes extend in a helical manner over the chip removal part starting at the main cutting edges of the drill tip. The drilling tool is separated into two parts in the region of the chip removal part and consists of a base body which is connected to the drill shank as one part and an exchangeable tip made of a harder material which is connected to the drill tip as another part. The exchangeable tip is connectable to the base body in a form-fitting and/or frictional-fitting manner at an axial separation point.

58 Claims, 7 Drawing Sheets

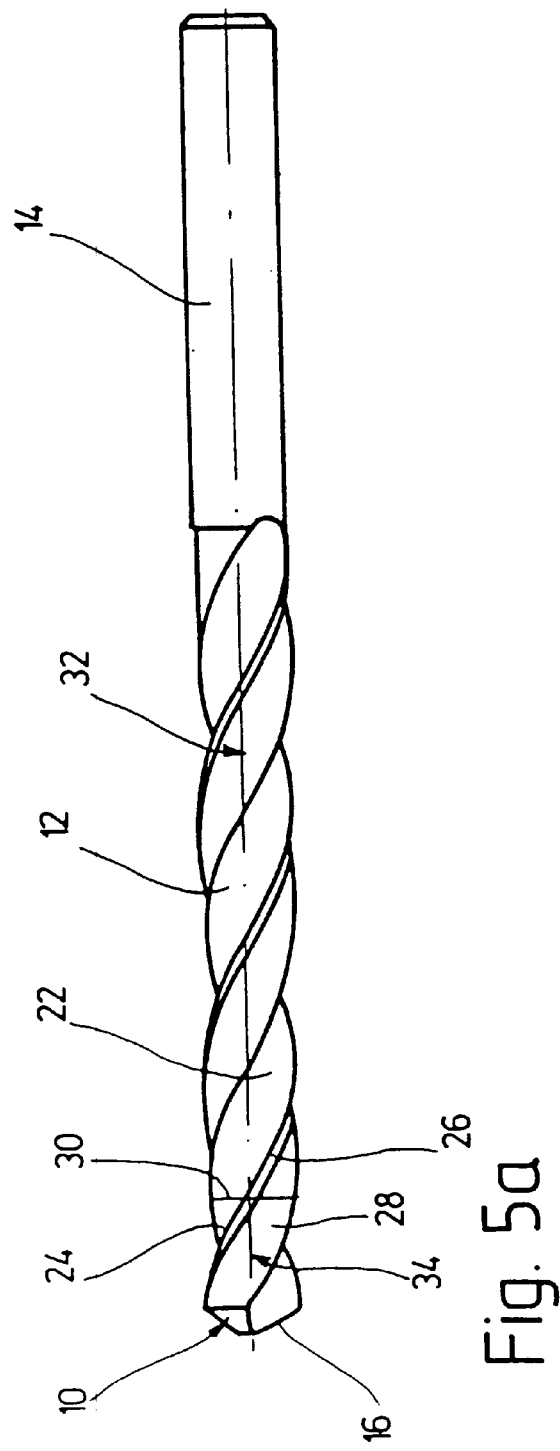
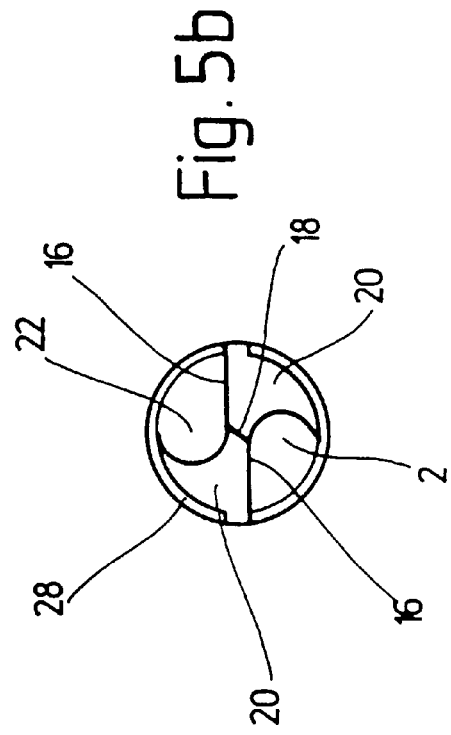
Fig. 5a
Fig. 5b

DRILLING TOOL

FIELD OF THE INVENTION

The invention relates to a drilling tool, having a removable drill tip. Various connections between the drill shank and drill tip, as well as various drill tip features are discussed.

BACKGROUND OF THE INVENTION

The twist drill is the most widely used drilling tool for drilling into solid material and bores having a diameter up to approximately 18 mm. The material used in manufacturing twist drills is alloyed tool steel, high-speed steel, and hard metal. If needed, the drill can be coated with a wear-reducing layer of e.g. titanium nitride. Wear occurs mainly in the vicinity of the drill tip in the region of the main cutting edge and at the guide chamfer. In order to eliminate the wear, it has been hitherto known to re-grind the drill at the corresponding flanks. In this, it is found to be disadvantageous that the drill becomes shorter during the grinding operation. In order to avoid this disadvantage, it is further known (DE-C-37 09 878) that the cutting part consists of a base body connected to the drill shank as one part and an exchangeable tip connected to the drill tip as one part, which are connectable to each other in a form- and friction-fitting manner at an axial separation point.

Based on this, it is the object of the invention to improve the known drilling tool of the type described above such that a reduction of wear and an improvement of the drilling quality can be obtained by simple productional measures.

SUMMARY OF THE INVENTION

The invention is based on the idea that with a separation into two parts of the drill in the region of the chip removal part the drill tip can be made of a different, harder material and easily exchanged when used to the limit of wear. In order to achieve this, it is proposed that the exchangeable tip as a whole consists of a material which is harder than the base body. The exchangeable tip advantageously consists of a cutting material from a group of hard metals or ceramics and may, in this case, be made as a sintered powder injection moulded part. The exchangeable tip can also be made of a wear-resistent coated tool steel. The base body on the other hand advantageously consists of tool steel or a high-speed steel.

In a preferred or alternative embodiment of the invention, the main cutting edges each have two cutting edges which are formed into the exchangeable tip, sloped against each other in a roof shape, and aligned in a generally radial direction. The cutting edges of the two main cutting edges can be positioned in equal radial distances from the drill axis, forming a double cutter, so that they are engaged over their full length during the drilling operation. This is advantageous, though, only when one of the two inner cutting edges overlaps with the drill axis. The cutting edge corners which protrude radially over the outer circumference of the drill tip advantageously merge into a generally axially aligned guide edge. The guide edge is adjoined in the circumferential direction by a guide rib which radially protrudes over the outer circumference and extends over part of the circumference of the drill tip. The peak and the outwardly protruding cutting edge corners of the two main cutting edges are positioned in equal radial distances from the drill axis. Accordingly, the outer cutting edges of the two main cutting edges are of equal length, while the inner cutting edges are of different length. In a preferred embodiment of the invention, the cutting edges and a plane which is perpendicular to the drill axis include an angle of 2° to 30°, preferably of 8° to 16°, so that the pairs of cutting edges of the main cutting edges include a roof angle of 120° to 176°, preferably of 148° to 164°.

The cutting edges formed into the exchangeable tip may be at least partially bevelled and/or rounded-off and possibly wave-shaped. Further, indentations, raised portions, steps, or ribs, which preferably reach the cutting edges, can be formed into the cutting faces. It is especially advantageous for the formation of the chips when chip forming hollows are formed into the cutting faces, which are preferably positioned at an axial distance with respect to the cutting edges. The chip forming hollows may have sides corresponding in shape to the roof-shape of the cutting edges at least at their sides adjoining the cutting edges. The cutting faces which are generally axially parallel and radially aligned delimit a chip space which merges into the chip flutes in the direction of chip travel.

In order to create the connection between the exchangeable tip and the base body, the exchangeable tip is advantageously connected in one piece to a coupling piece which protrudes over the side opposing the front rake. The coupling piece itself has a driver which meshes with a complementary driving part of the base body and may be fitted with an anchoring pin which protrudes centrally over the exchangeable tip and which can be inserted into the base body and anchored there in a form- and/or frictional-fitting manner. Advantageously, the coupling piece has two mutually opposed drivers which each mesh with a complementary driving part of the base body.

In order to ensure an exact centering of the exchangeable tip on the base body, it is of advantage when the coupling piece has at least two partially cylindrical, convex centering sections which are positioned or distributed over or about the circumference and which fit exactly into a bushing at the base body, which has partially cylindrical, concave centering sections which are complementary to the convex centering sections. For the rotary drive there are provided at least two axially open radial recesses, which are positioned inbetween two adjacent convex centering sections of the coupling piece, for the engagement of a driver tooth which radially protrudes into the bushing between two adjacent concave centering sections of the base body.

For the frictional connection between the exchangeable tip and the base body, it is of advantage when the exchangeable tip has a plane shoulder which protrudes generally radially over the coupling piece. The shoulder preferably is pressable against a plane face of the base body by means of a clamping mechanism. The shoulder and face are preferably each subdivided into two areas which are separated from each other in the circumferential direction by the flutes. A further improvement in this respect is attained in that the coupling piece has an end face which protrudes generally radially over the anchoring pin, the end face being pressable against a bottom face which delimits the bushing.

For the creation of a form- and frictional-fitting connection between the exchangeable tip and the base body, at least one generally radially aligned conical countersink is advantageously positioned in the coupling piece, a threaded bolt having a conical tip, which is positioned in a generally radial threaded bore in the base body, being engaged in a form- and friction-fitting manner in the countersink. The conical countersink is advantageously formed into one of the drivers of the coupling piece, while the threaded bore penetrates one of the driving pieces of the base body.

In a further possible connection between the exchangeable tip and the base body, the coupling piece of the exchangeable tip has a continuous cross bore, through which a clamping screw extends, which is led through a bore of the driving part of the base body and which is screwed into a threaded bore of the opposing driving part, by which a tensioning between the exchangeable tip and the base body without any free play in the axial and circumferential directions is created.

Especially in drilling tools having a very small diameter, in which a mechanical connection between the exchangeable tip and the base body is difficult, the exchangeable tip and the base body are advantageously laser-welded or hard-soldered to each other at their joining locations which are positioned between the coupling piece and the bushing.

In a further advantageous embodiment of the invention, the exchangeable tip has an axial snap-in reception which is delimited by a circumferential face and is located in the region of the separation point, into which a snap-in pin, which protrudes axially over a circumferential shoulder, can be inserted and locked by pressing the shoulder against the face. This ensures that the torque and retracting forces acting on the drill are taken up by the separating point.

The snap-in pin may carry a catch spring which can be snapped into at least one radial undercut within the snap-in reception. Advantageously, the catch spring has two catch legs which radially protrude in opposite directions of the snap-in pin slanted in the direction of the shoulder, the catch legs being engageable into the undercuts of the snap-in reception while creating an axial pre-tension. The catch legs may be connected to each other in one piece by means of a spring pin which is connected to the face side of the snap-in pin. The catch spring can be screwed to the face side of the snap-in pin preferably by two screws which extend through two holes in the spring pin, or welded, soldered or glued to the snap-in pin in the region of the spring pin. It has proven to be especially advantageous when the catch spring is welded to the snap-in pin by means of laser welding. Additionally, the snap-in pin can have an undercut groove for the form-fitting acception of the complementary deformed spring pin. In principle it is also possible to directly form the catch legs, which are formed to be spring tongues, onto the snap-in pin.

In a further preferred embodiment of the invention the radial undercut is formed by a transverse or slanted opening which penetrates the wall of the snap-in reception, wherein the transverse or slanted opening penetrates one of the side rakes of the exchangeable tip and the catch leg or the spring tongue can be unlocked from the outside through the corresponding transverse or slanted opening.

For the transmission of force and torque in the region of the separation plane, it is of advantage when the snap-in reception and the snap-in pin have a generally rectangular cross section with two mutually opposing broad side faces and small side faces, wherein the broad side faces are located adjacent the outer chip surfaces within the chip removal part and the small side faces are located adjacent to the outer side rakes.

In order to save space, when the catch legs overlap the snap-in pin in the region of its small side faces in the direction of the shoulder, pockets for the reception of the catch legs are left free between the small side faces of the snap-in pin and the snap-in reception. On the other hand, for the improvement of the rotary drive in the region of the separation plane, the snap-in pin is fit into the complementary snap-in reception with its opposing, parallel aligned broad side faces. With respect to the slanted outwardly directed snap-in legs of the catch spring, it is of advantage, when the broad side faces have a generally trapeze-shaped outline and that the small side faces are correspondingly positioned in a wedge shape with respect to each other.

In order to achieve an axial friction-fit in the region of the separation plane, the catch legs of the catch spring have a snap-in base which can be snapped into the undercut under radial spreading and which are supported in the snapped-in state on a preferably slanted locking face of the undercut. The locking face advantageously includes an angle of 5° to 15° with a radial plane which is perpendicular with respect to the drill axis.

In principle it is possible, to form the snap-in pin and the snap-in reception rotationally symmetrical with respect to the drill axis. In this case at least one fitting bolt is additionally provided radially outside the snap-in pin which engages in facing axially parallel fitting bores of the base body and the exchangeable tip for the transmission of torque.

It is further possible to fix the snap-in pin in the snap-in reception by means of at least one locking screw which extends through a threaded bore in the wall of the snap-in reception.

In an advantageous embodiment of the invention, the base body and the exchangeable tip are connectable to each other in a frictional-fitting manner by means of a fitting pin or bolt which is made of a shape memory alloy. The fitting pin or bolt can be screwed with its one end into an axial threaded bore of the base body and with its other end into a fitting bore of the exchangeable tip in a frictional-fitting manner.

According to an advantageous embodiment of the invention, centering means are provided, which center the exchangeable tip on the base body in a non-rotatable manner. The centering means can have at least one centering cam which is positioned in the snap-in reception and which engages in an open-edged opening of the snap-in pin, or at least one fitting bolt which bridges the separating point and which engages in aligned fitting bores of the exchangeable tip and base body.

In order to improve the drilling result, at least one coolant bore which penetrates the base body and the exchangeable tip axially or in a spiral manner and which bridges the separating point may be provided.

In order to reduce the amount of stock, a base body having a given outer diameter may be fitted with exchangeable tips which have differing outer diameters.

BRIEF DESCRIPTION OF THE DRAWINGS

In the following, the invention is further described with the aid of embodiments schematically shown in the drawing, in which

FIG. 1f shows an enlarged section of the base body of the drilling tool according to FIG. 1a;

FIG. 3b shows a different perspective view of the exchangeable tip in FIG. 3a;

FIG. 4b shows a front face view of the base body of the drilling tool of FIG. 4a;

FIG. 5a shows a side view of a twist drill having an exchangeable tip;

FIG. 5b shows a top view of the drill tip in a representation enlarged with respect to FIG. 1a;

DETAILED DESCRIPTION

Figure 1A:
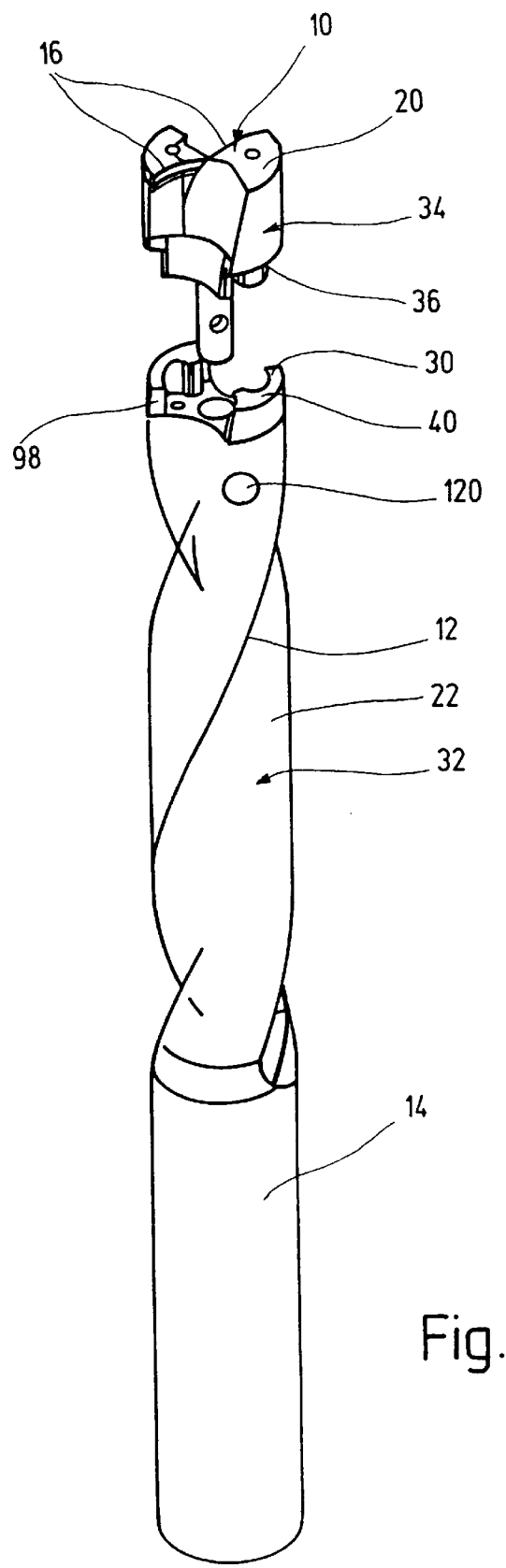
FIG. 1a shows a side view of a drilling tool having an exchangeable tip in an exploded view.
Figure 1B:
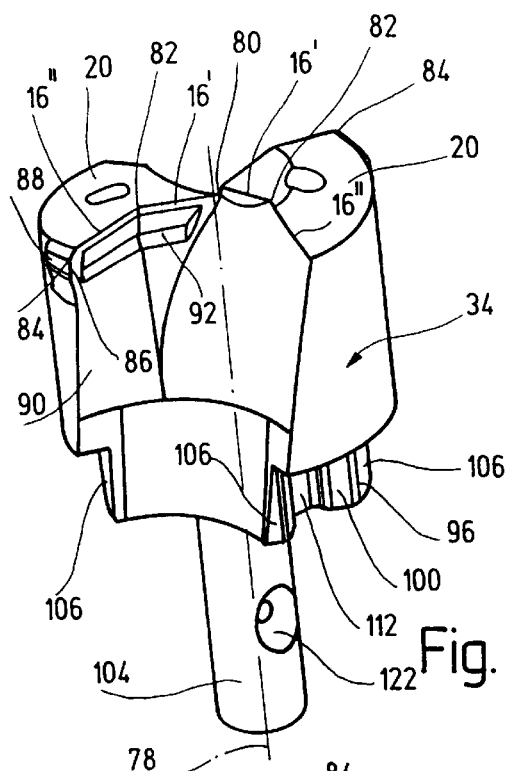
FIG. 1b shows a perspective view of the exchangeable tip of FIG. 1.
Figure 1C:
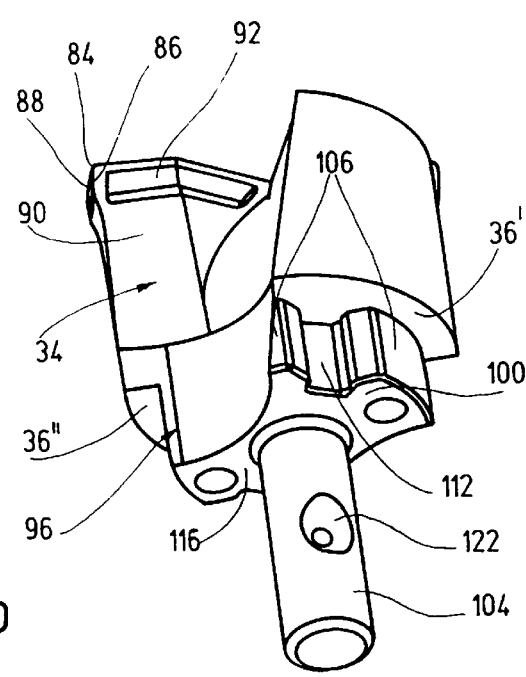
FIG. 1c shows a different perspective view of the exchangeable tip of FIG. 1.
Figure 1D:
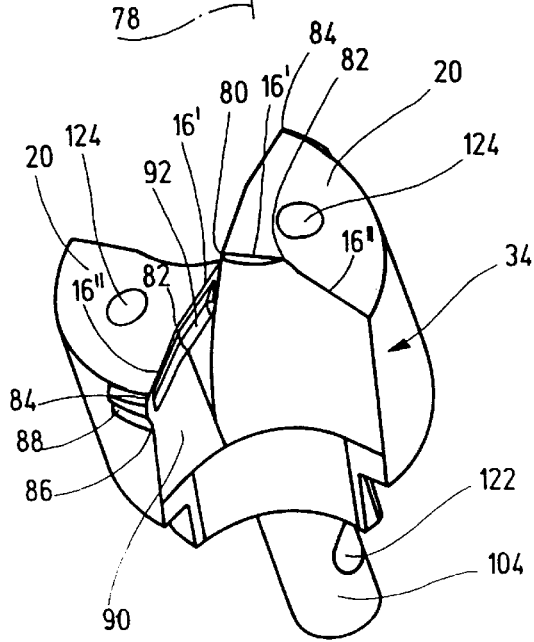
FIG. 1d shows another perspective view of the exchangeable tip of FIG. 1.
Figure 1E:
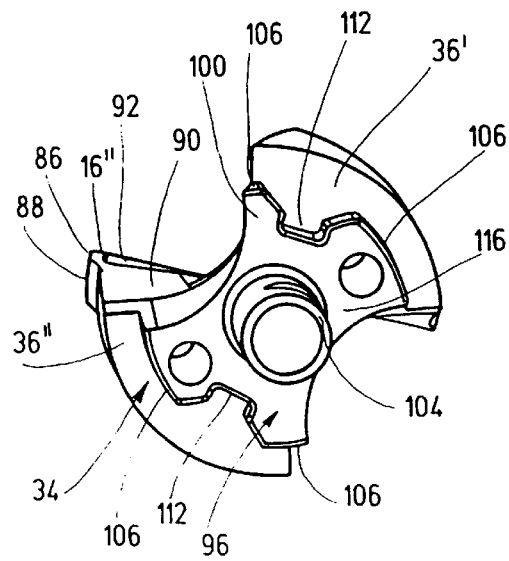
FIG. 1e shows yet another different perspective view of the exchangeable tip of FIG. 1.

The drilling tools shown in the drawing are divided into two parts at a separation point 30 and consist of a base body 32 which carries a drill shank 14 and an exchangeable tip 34 which carries a drill tip 10, which are connectable to each other in a form- and frictional-fitting manner (FIGS. 1 to 9) or only in a frictional-fitting manner (FIG. 10) at the separation point 30. While the base body 32 is made of tool steel or a high-speed steel, the exchangeable tip in its entirety is a form part made of a cutting material selected from the group of hard metals or ceramics, which is manufactured as a sintered powder injection moulded part. In principle it is also possible to manufacture the exchangeable tip of a tool steel which is coated with a wear-resistant material.

The drilling tool shown in FIGS. 1 to 4 has a drill tip 10, a chip removal part 12 which follows the drill tip and which is possibly formed to be a cutting part, and a drill shank 14 which is formed to the rear of the chip removal part. The drill tip 10 has two main cutting edges 16 and two front rakes 20 adjacent to the main cutting edges. Two helical flutes 22 extend from the main cutting edges 20 of the drill tip 10 over the chip removal part 12 up to the drill shank. The separation point 30 is located in the region of the chip removal part 12.

The main cutting edges 16 each have two cutting edges 16', 16" which are formed into the exchangeable tip 34, pairs of which are positioned in a roof shape with respect to each other, and which are generally radially aligned. The cutting edges 16', 16" form double cutters and are positioned at the same radial distance with respect to the drill axis 78. As can be seen especially from FIG. 1b and d, only one of the inner cutting edges 16' overlaps the drill axis 78, while the other inner cutting edge 16' is excentrically adjacent to a step 80. The peak 82 of the roof and the outwardly protruding cutting edge corners 84 of the two main cutting edges 16 are positioned at the same radial distances from the drill axis. The outer cutting edges 16" are therefore of equal length and the inner cutting edges 16' of different length. The pairs of cutting edges 16', 16" include roof angles of 148° to 164° at the peak. They ensure that the drill tip is centered in the bore during drilling and does not run out.

The cutting edge corners 84 which radially protrude over the circumference of the drill tip merge into a guide edge 86, adjoining which is a guide rib 88 which extends over part of the circumference of the drill tip 10 and which protrudes radially over the circumference.

The flutes 22 which begin immediately beyond the main cutting edges 16 in the direction of chip travel are delimited by the cutting face 90 at the side of the cutting edges 16', 16". In the case of FIG. 1a to FIG. 1e, chip forming hollows 92 are formed spaced with respect to the cutting edges 16', 16". The cutting edge sided borders have a shape that conforms with the roof shape of the cutting edges 16', 16" . In the embodiment shown in FIG. 2 a plurality of indentations 94 which penetrate the cutting edges 16', 16" are provided in place of the chip forming hollows.

Figure 2:
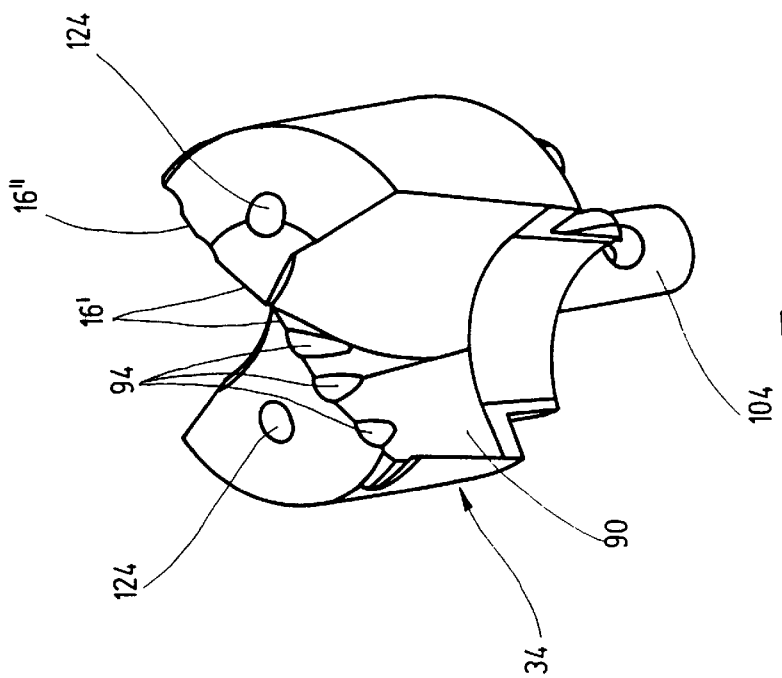
FIG. 2 shows an embodiment of an exchangeable tip modified with respect to FIG. 1 in a perspective view corresponding to FIG. 1d.
Figure 1F:
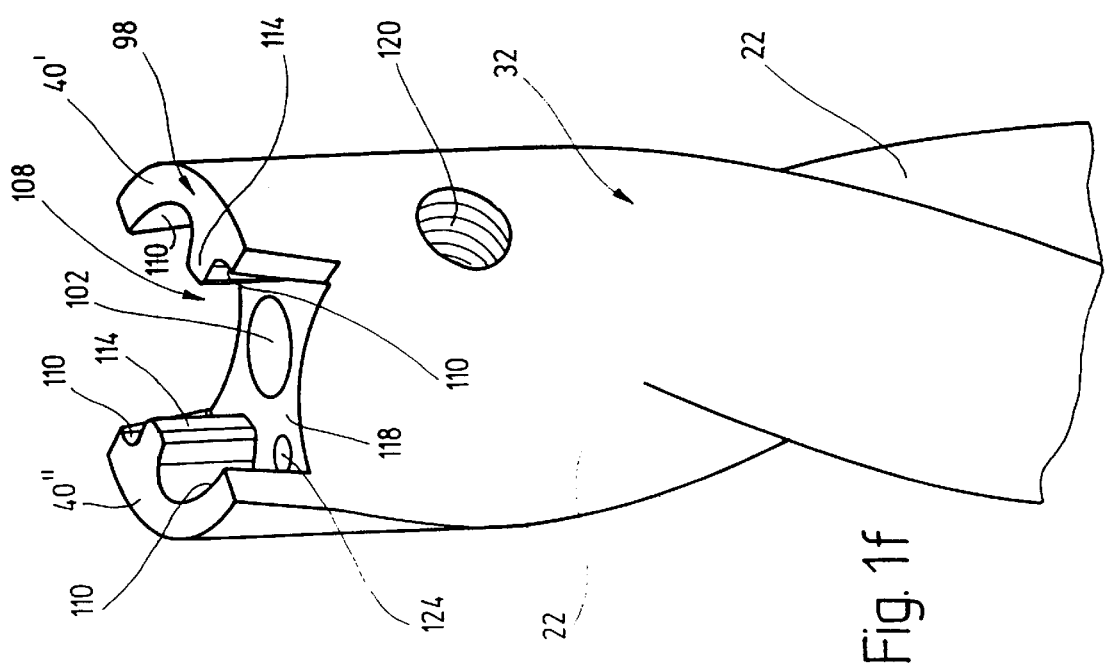
Figure 3A:
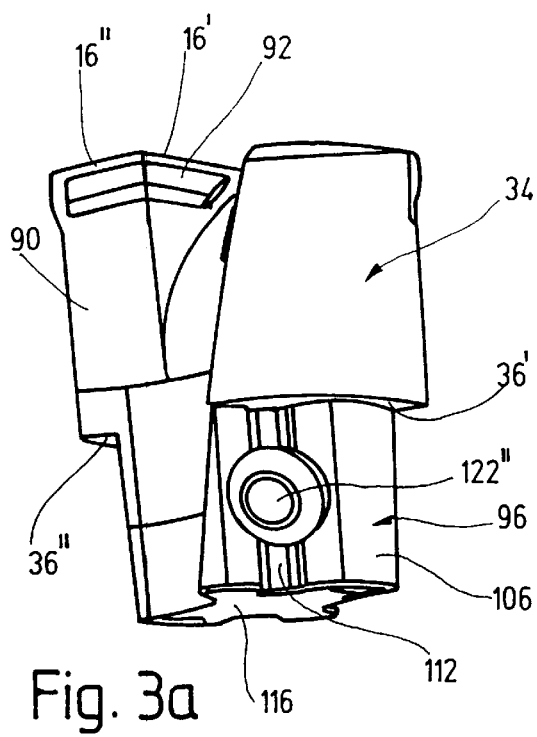
FIG. 3a shows a further modified embodiment of an exchangeable tip in a perspective view.
Figure 3B:
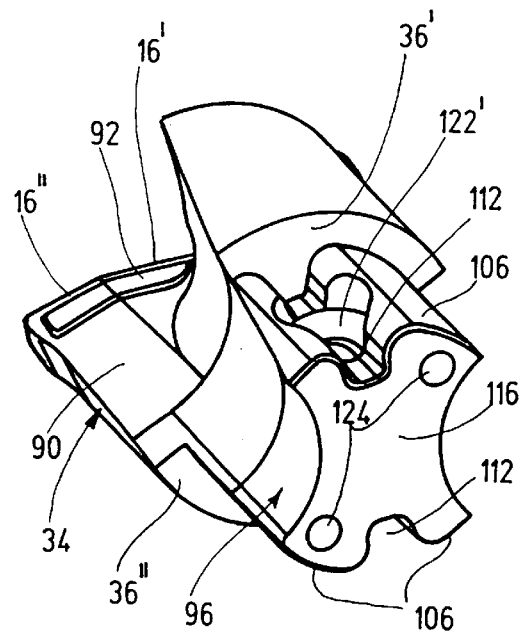
Figure 3C:
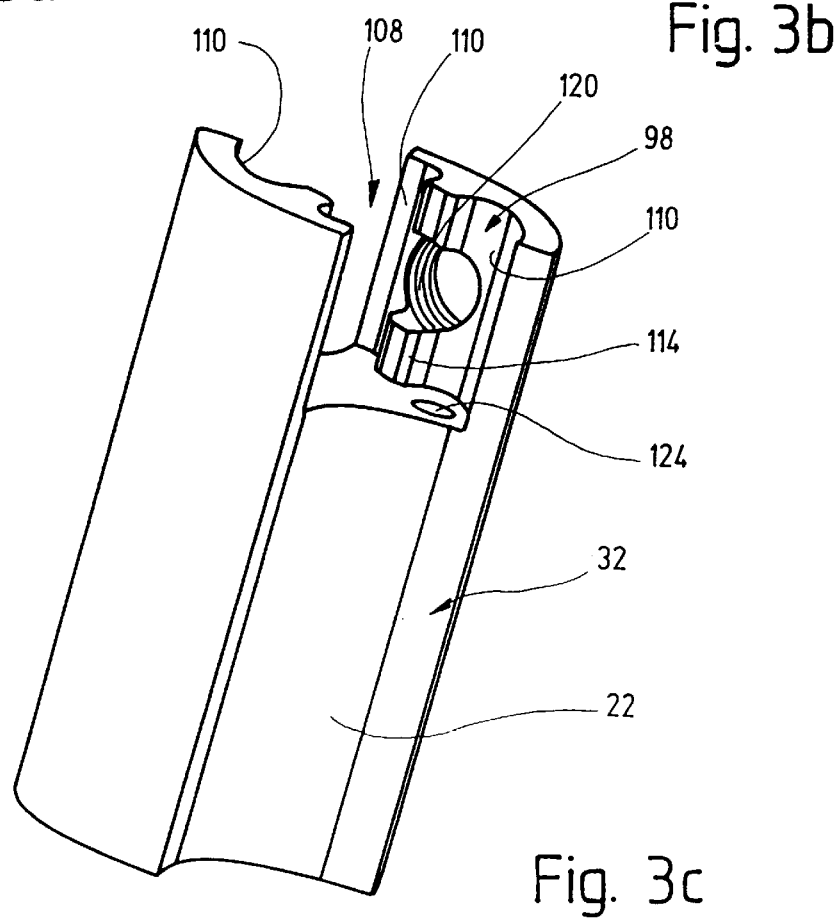
FIG. 3c shows a section of the base body for the exchangeable tip of FIG. 3a and b.

The exchangeable tip has a coupling piece 96 at its side opposing the front rakes 20, which has a rotary driver 100 which meshes with a complementary centering and driving part 98 of the base body 32. In the embodiments of FIGS. 1 and 2 there is additionally provided an axially protruding anchoring pin 104 which is insertable into a mounting bore 102 of the base body 32 and which can be anchored there in a form- and friction-fitting manner.

The driver 100 has four partially cylindrical convex centering sections 106 which are spaced from one another circumferentially, which fit exactly in a bushing 108 of the base body with partially cylindrical concave centering sections 110 which are complementary to the centering sections 106. The rotary drive is effected by way of the flanks of the axially open radial recesses 112 each of which is positioned between two convex centering sections 106. A driver tooth 114 engages in each of the radial recesses 112, which protrudes radially into the bushing 108 between two adjacent concave centering sections 110 of the base body 32.

The exchangeable tip has a plane shoulder 36 protruding radially over the coupling piece 96, which is pressable against a plane face 40 of the base body 32 by way of a clamping mechanism acting on the anchoring pin 104 (FIGS. 1 and 2) or the coupling piece 96 (FIGS. 3 and 4). The shoulder 36 and face 40 are each divided into two areas 36', 36" and 40', 40" which are separated from each other in the circumferential direction by the flutes 22.

Figure 4A:
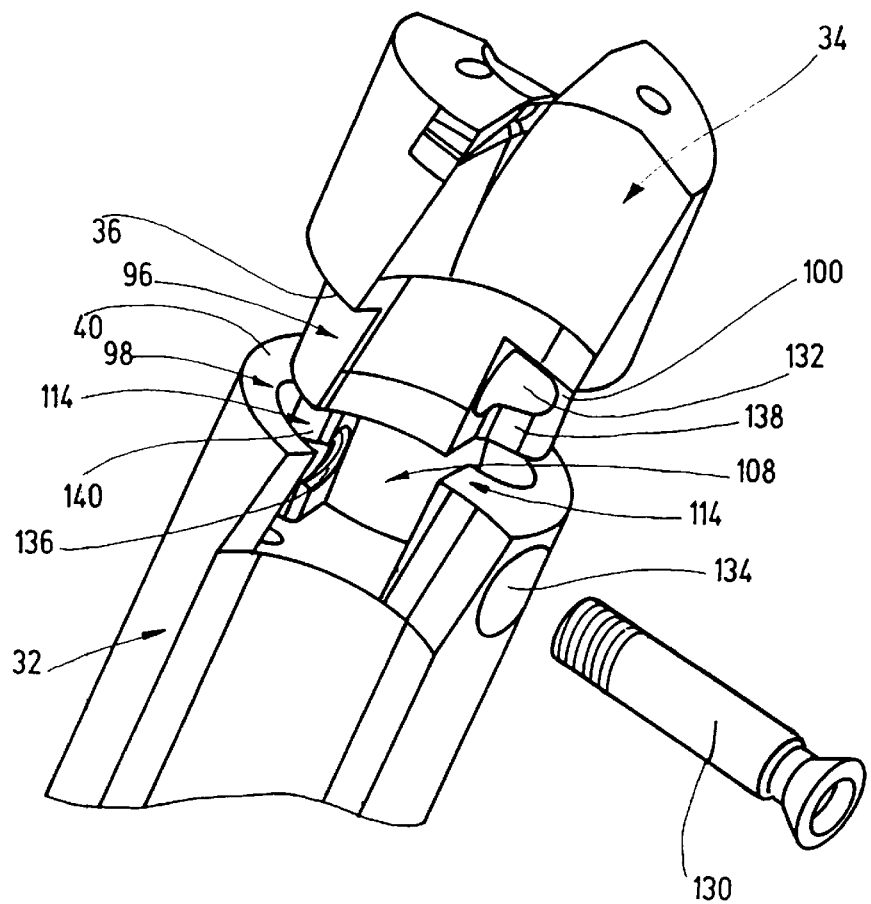
FIG. 4a shows an exploded view of a further modified embodiment of a drilling tool having an exchangeable tip.

The clamping mechanism has a clamping screw 130 shown in examplary fashion in FIG. 4a. In the embodiments shown in FIGS. 1 to 3, the clamping screw is positioned in a threaded bore 120, 120' of the base body 32 and engages in an excentric conical countersink 122, 122' of the exchangeable tip with a conical tip. In the embodiment of FIGS. 1 and 2, the conical countersink 122 is positioned in the anchoring pin 104 which is located in the mounting bore 102, while in the embodiment of FIGS. 3a to c the conical countersink 122' is positioned in the region of one of the radial recesses 112 of the coupling piece, whereas the bore 122' penetrates the wall in the region of one of the driver teeth 114.

Figure 4B:
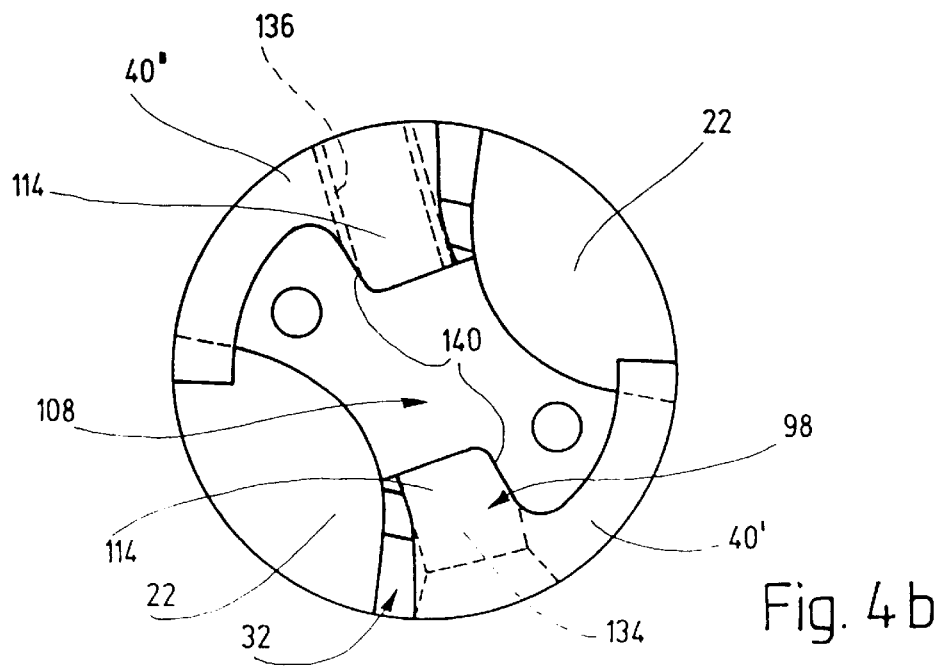

In the embodiment of FIG. 4a and FIG. 4b the coupling piece 96 of the exchangeable tip 34 has a continuous cross bore 132, through which a sink-head screw 130, which is led through a continuous countersunk bore 134 in a driver part 98, 114 of the base body and which is screwed into a threaded bore 136 of the diametrically opposed driver part 98, 114, penetrates between the exchangeable tip 34 and the base body 32 while creating play-free tension in the axial direction in the region of the faces 36, 40 and in the circumferential direction in the region of the mating flanks 138, 140 of the driver 100 and the driver parts 98.

The coupling piece 96 further has an end face 116 which faces the bottom face 118 of the bushing 108.

The twist drill shown in FIGS. 5a and b has a drill tip 10, a cutting portion 12 following the drill tip, and a drill shank 14 which is formed to the rear of the cutting portion. The drill tip has two main cutting edges 16, a chisel edge 18 which connects the main cutting edges at the tip, and two front rakes 20 adjacent to the main cutting edges and the chisel edge. Two helical flutes 22, which are delimited laterally by a minor cutting edge 24 with an adjoining guide chamfer 26 as well as by a side rake 28, extend from the main cutting edges 20 in the drill tip 10 over the cutting portion 12.

The twist drill is divided into two parts at a separation point 30 in the region of the cutting portion 12 and consists of a base body 32 carrying the drill shank 14 and an exchangeable tip 34 carrying the drill tip 10.

A variety of coupling means in the region of the separation point 30 are shown in FIGS. 6 to 10. In the embodiments of FIGS. 6 to 9 the base body 32 has a snap-in pin 38 which protrudes over a circumferential shoulder 36. The snap-in pin 38 can be snapped into an axial snap-in reception 42 of the exchangeable tip 34, which is delimited by a circumferential face 40, while pressing the shoulder 36 against the face 40. The snap-in pin 38 carries a catch spring 44, which can be snapped into two radial undercuts 48 in the snap-in reception 42 with its catch legs 46 which radially extend slanted in the direction of the shoulder 36. The radial undercuts 48 are formed to be slanted openings in the wall 50 of the snap-in reception 42, through which the catch legs 46 can be unlocked from the outside. The catch legs 46 have a snap-in base 53 which can be snapped into the undercuts 48 under radial spreading and which is axially supportable under tension in the snapped-in state on a slanted locking face 52. The locking face 52 and a radial plane 54 which is perpendicular to the drill axis include an angle $\beta$ of 5° to 15°.

Figure 6:
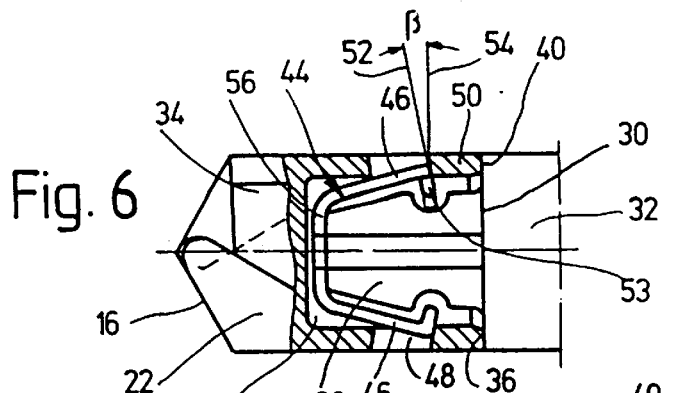
FIG. 6 shows a section through the separation point of the twist drill having a first coupling variant.
Figure 7:
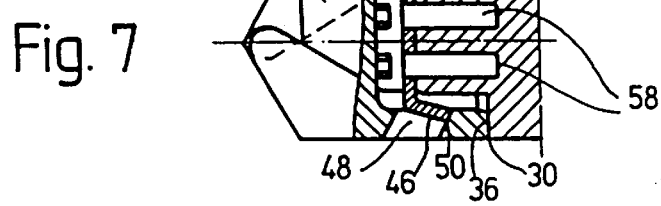
FIG. 7 shows a section through the separation point of the twist drill having a second coupling variant.
Figure 8:
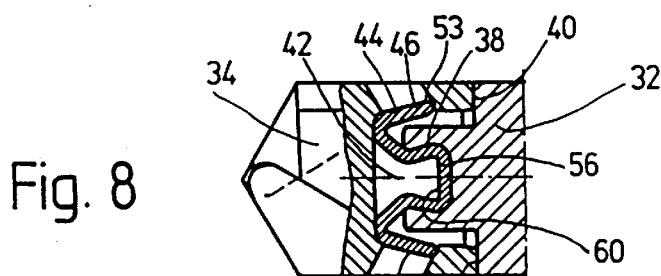
FIG. 8 shows a section through the separation point of the twist drill having a third coupling variant.

In the embodiments of FIGS. 6 to 8 the two catch legs 46 are connected to each other as one part by means of spring pin 56 which is connected to the front of the snap-in pin 38. In the embodiment of FIG. 6 the catch spring 44 is welded, soldered or glued with its spring pin 56 to the front face of the snap-in pin 38, whereas in the embodiment of FIG. 7 it is screwed to the snap-in pin 38 by means of two screws 58. In FIG. 8 the snap-in pin has an undercut groove 60 for the form-fitting reception of the complementary deformed spring pin 56.

Figure 9A:
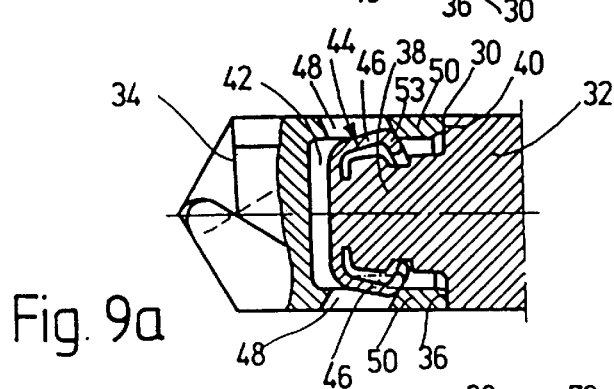
FIG. 9a shows an axial section through the separation point of the twist drill having a fourth coupling variant.

In the embodiment of FIG. 9a the catch legs 46 are formed onto the snap-in pin 38 in the form of spring tongues.

Figure 9B:
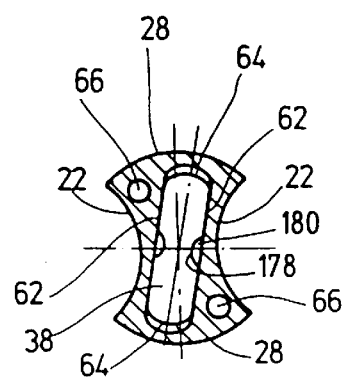
Fig. 9b shows a radial section through the separation point of the twist drill having a fourth coupling variant.

As can be seen from the section of FIG. 9b, the snap-in reception 42 and the snap-in pin 38 have a generally rectangular cross section or outline, wherein two mutually opposing broad side faces 62 and small side faces 64 are formed. The broad side faces 62 each adjoin one of the outer flutes 22 within the cutting portion and the small side faces 64 each adjoin one of the outer side rakes 28. The rotary drive between the base body 32 and the exchangeable tip 34 is effected mainly by way of the plane-parallel broad side faces 62, with which the snap-in pin 38 is fitted into the complementary snap-in recess. Suitable centering means are provided for centering the exchangeable tip 34 on the base body 32, which, in the embodiment of FIG. 9b, are formed by two centering cams 178 which have a semi-circular cross section. The centering cams 178 engage in corresponding open-edged openings 180 in the broad side faces 62 of the snap-in pin 38. In the embodiment of FIG. 9b two coolant bores 66 are additionally provided, which are aligned in pairs at the separation point 30.

Figure 10:
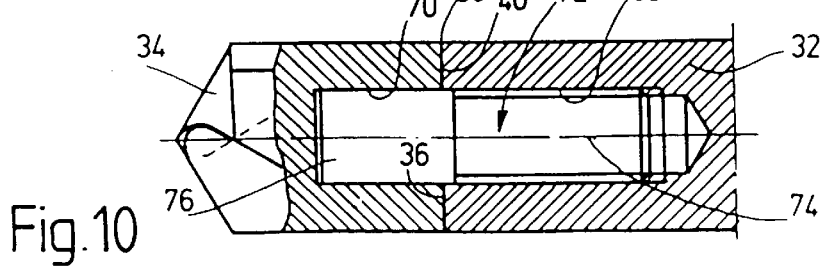
FIG. 10 shows an axial section through the separation point of the twist drill having a fifth coupling variant.

In the embodiment shown in FIG. 10 the base body 32 has a threaded bore 68 which is open toward the separation point 30, and the exchangeable tip 34 has a fitting bore 70 which is aligned with the threaded bore 68. A bolt 72 is screwed into the threaded bore 68 with its threaded part 74, which engages with its thread-free part 76 in the fitting bore 70 of the exchangeable tip 34 in a friction-fitting manner. The bolt 72 consists of a shape memory alloy. It is fitted into the fitting bore 70 at a low temperature and expands in the bore at room temperature to create a friction-fitting connection.

I claim:

1. A drilling tool, comprising a drill tip having two main cutting edges positioned at approximately equal circumferential distances from each other, and two cutting faces and front rakes adjoining the main cutting edges, a chip removal part axially adjoining the drill tip and formed as a cutting part, a drill shank positioned at an end of the chip removal part opposing the drill tip, and two chip flutes which extend in a helical manner over the chip removal part starting at the main cutting edges of the drill tip, the chip removal part comprising a base body connected to the drill shank as one part and an exchangeable tip connected to the drill tip as another part, which are connectable to each other in a form-fitting or frictional-fitting manner at an axial separation point, the exchangeable tip as a whole comprising a material harder than the base body, the exchangeable tip connecting in one piece to a coupling piece protruding over the side opposing the front rake, the coupling piece having a driver for meshing with a complementary driving part of the base body, the coupling piece having an anchoring pin protruding centrally over the exchangeable tip and insertable into the base body for anchoring therein in a form-fitting or frictional-fitting manner, the coupling piece having at least two partially cylindrical, convex centering sections positioned about the circumference and which fit into a bushing at the base body having partially cylindrical, concave centering sections complementary to the convex centering sections.

2. A drilling tool, comprising a drill tip having two main cutting edges positioned at approximately equal circumferential distances from each other, and two cutting faces and front rakes adjoining the main cutting edges, a chip removal part axially adjoining the drill tip and formed as a cutting part, a drill shank positioned at an end of the chip removal part opposing the drill tip, and two chip flutes which extend in a helical manner over the chip removal part starting at the main cutting edges of the drill tip, the chip removal part comprising a base body connected to the drill shank as one part and an exchangeable tip connected to the drill tip as another part, which are connectable to each other in a form-fitting or frictional-fitting manner at an axial separation point, the exchangeable tip as a whole comprising a material harder than the base body, the exchangeable tip connecting in one piece to a coupling piece protruding over the side opposing the front rake, and the coupling piece having at least two partially cylindrical, convex centering sections positioned about the circumference and which fit into a bushing at the base body having partially cylindrical, concave centering sections complementary to the convex centering sections.

3. The drilling tool of claim 1, wherein at least one axially open radial recess is positioned inbetween two adjacent ones of the convex centering sections of the coupling piece for the engagement of a driver tooth radially protruding into the bushing between two adjacent ones of the concave centering sections of the base body.

4. A drilling tool, comprising a drill tip having two main cutting edges positioned at approximately equal circumferential distances from each other, and two cutting faces and front rakes adjoining the main cutting edges, a chip removal part axially adjoining the drill tip and formed as a cutting part, a drill shank positioned at an end of the chip removal part opposing the drill tip, and two chip flutes which extend in a helical manner over the chip removal part starting at the main cutting edges of the drill tip, the chip removal part comprising a base body connected to the drill shank as one part and an exchangeable tip connected to the drill tip as another part, which are connectable to each other in a form-fitting or frictional-fitting manner at an axial separation point, the exchangeable tip as a whole comprising a material harder than the base body, the exchangeable tip connecting in one piece to a coupling piece protruding over the side opposing the front rake, the coupling piece having a driver for meshing with a complementary driving part of the base body, the coupling piece having an anchoring pin protruding centrally over the exchangeable tip and insertable into the base body for anchoring therein in a form-fitting or frictional-fitting manner, the exchangeable tip including a plane shoulder protruding generally radially over the coupling piece, and the shoulder being pressable against a plane face of the base body by means of a clamping mechanism.

5. The drilling tool of claim 4, wherein the shoulder and the plane face are each subdivided into two areas separated from each other in the circumferential direction by the flutes.

6. The drilling tool of claim 1, wherein at least one generally radially aligned conical countersink is positioned in the coupling piece, and a threaded bolt having a conical tip is positioned in a generally radial threaded bore in the base body for engagement in a form-fitting and friction-fitting manner in the countersink.

7. The drilling tool of claim 6, the driver comprising one of a plurality of drivers, and wherein the conical countersink is formed into one of the drivers of the coupling piece, and the threaded bore penetrates one of a plurality of driving pieces of the base body.

8. The drilling tool of claim 1, the driving part comprising one of a plurality of opposing driving parts, and wherein the coupling piece of the exchangeable tip has a continuous cross bore, through which a clamping screw extends, which is led through a bore of the driving part of the base body and which is screwed into a threaded bore of the opposing driving part, by which a tensioning between the exchangeable tip and the base body without any free play in the axial and circumferential directions is created.

9. A drilling tool, comprising a drill tip having two main cutting edges positioned at approximately equal circumferential distances from each other, and two cutting faces and front rakes adjoining the main cutting edges, a chip removal part axially adjoining the drill tip and formed as a cutting part, a drill shank positioned at an end of the chip removal part opposing the drill tip, and two chip flutes which extend in a helical manner over the chip removal part starting at the main cutting edges of the drill tip, the chip removal part comprising a base body connected to the drill shank as one part and an exchangeable tip connected to the drill tip as another part, which are connectable to each other in a form-fitting or frictional-fitting manner at an axial separation point, the exchangeable tip as a whole comprising a material harder than the base body, the exchangeable tip connecting in one piece to a coupling piece protruding over the side opposing the front rake, the coupling piece having a driver for meshing with a complementary driving part of the base body, the coupling piece having an anchoring pin protruding centrally over the exchangeable tip and insertable into the base body for anchoring therein in a form-fitting or frictional-fitting manner, wherein the coupling piece has an end face protruding generally radially over the anchoring pin, and the end face being pressable against a bottom face delimiting a bushing.

10. The drilling tool of claim 1, wherein the exchangeable tip and the base body are laser-welded or hard-soldered to each other at their joining locations which are positioned between the coupling piece and the bushing.

11. The drilling tool of claim 1, wherein a coolant bore penetrates the base body and the exchangeable tip and bridges the separating point.

12. The drilling tool of claim 1, wherein the base body and the exchangeable tip have outer diameters which differ from one another.

13. The drilling tool of claim 1, wherein the material of the exchangeable tip comprises a cutting material from a group of hard metals, ceramics or tribologically-resistent coated tool steels.

14. The drilling tool of claim 1, wherein the exchangeable tip is formed as a sintered powder injection moulding part.

15. The drilling tool of claim 1, wherein the base body comprises tool steel or a high-speed steel.

16. The drilling tool of claim 1, wherein the main cutting edges each have two cutting edges formed into the exchangeable tip, sloped against each other in a roof shape, and aligned in a generally radial direction.

17. The drilling tool of claim 16, wherein the cutting edges of the two main cutting edges are positioned in equal radial distances from a drill axis, forming a double cutter.

18. The drilling tool of claim 16, the two cutting edges of each of the main cutting edges comprising an inner cutting edge and an outer cutting edge, and wherein only one of the two inner cutting edges overlaps with a drill axis.

19. The drilling tool of claim 16, wherein cutting edge corners of the cutting edges protrude radially over an outer circumference of the drill tip and merge into generally axially aligned guide edges.

20. The drilling tool of claim 19, wherein a guide rib radially protrudes over the outer circumference and extends over part of the circumference of the drill tip and adjoins the guide edge in a circumferential direction.

21. The drilling tool of claim 16, wherein a peak and outwardly protruding cutting edge corners of the two main cutting edges are positioned in equal radial distances from a drill axis.

22. The drilling tool of claim 16, the two cutting edges of the two main cutting edges comprising respective inner and outer cutting edges, and wherein the outer cutting edges are of equal length and the inner cutting edges are of different length.

23. The drilling tool of claim 16, wherein the cutting edges and a plane which is perpendicular to a drill axis include an angle of 2° to 30°.

24. The drilling tool of claim 16, wherein the pairs of cutting edges of the main cutting edges include a roof angle of 120° to 176°.

25. The drilling tool of claim 16, wherein the cutting edges are wave-shaped.

26. The drilling tool of claim 16, wherein indentations, raised portions, steps, or ribs, which reach the cutting edges, are formed into the cutting faces.

27. The drilling tool of claim 16, wherein the cutting edges are at least partially bevelled or rounded-off.

28. The drilling tool of claim 1, wherein the exchangeable tip is formed as a helical drill tip having a chisel edge.

29. The drilling tool of claim 16, wherein chip forming hollows are formed into the cutting faces positioned at an axial distance with respect to the cutting edges.

30. The drilling tool of claim 29, wherein the chip forming hollows have sides corresponding in shape to the roof-shape of the cutting edges at least at sides adjoining the cutting edges.

31. The drilling tool of claim 1, wherein the cutting faces which are generally axially parallel and radially aligned delimit a chip space which merges into the chip flutes in a direction of chip travel.

32. The drilling tool of claim 1, wherein the exchangeable tip includes at least one coolant bore which is generally axially parallel and exists in a region of the front rakes.

33. The drilling tool of claim 2, wherein at least one axially open radial recess is positioned inbetween two adjacent ones of the convex centering sections of the coupling piece for the-engagement of a driver tooth radially protruding into the bushing between two adjacent ones of the concave centering sections of the base body.

34. The drilling tool of claim 2, wherein the exchangeable tip includes a plane shoulder protruding generally radially over the coupling piece, the shoulder being pressable against a plane face of the base body by means of a clamping mechanism.

35. The drilling tool of claim 34, wherein the shoulder and the plane face are each subdivided into two areas separated from each other in the circumferential direction by the flutes.

36. The drilling tool of claim 2, wherein at least one generally radially aligned conical countersink is positioned in the coupling piece, and a threaded bolt having a conical tip is positioned in a generally radial threaded bore in the base body for engagement in a form-fitting and friction-fitting manner in the countersink.

37. The drilling tool of claim 2, the driver comprising one of a plurality of drivers, and wherein the conical countersink is formed into one of the drivers of the coupling piece, and the threaded bore penetrates one of the driving pieces of the base body.

38. The drilling tool of claim 2, the driving part comprising one of a plurality of opposing driving parts, and wherein the coupling piece of the exchangeable tip has a continuous cross bore, through which a clamping screw extends, which is led through a bore of the driving part, of the base body and which is screwed into a threaded bore of the opposing driving part, by which a tensioning between the exchangeable tip and the base body without any free play in the axial and circumferential directions is created.

39. The drilling tool of claim 2, wherein the coupling piece has an end face pressable against a bottom face delimiting the bushing.

40. The drilling tool of claim 2, wherein the exchangeable tip and the base body are laser-welded or hard-soldered to each other at their joining locations which are positioned between the coupling piece and the bushing.

41. The drilling tool claim 2, wherein a coolant bore penetrates the base body and the exchangeable tip and bridges the separating point.

42. The drilling tool claim 2, wherein the base body and the exchangeable tip have outer diameters which differ from one another.

43. The drilling tool of claim 2, wherein the material of the exchangeable tip comprises a cutting material from a group of hard metals, ceramics or tribologically-resistant coated tool steels.

44. The drilling tool of claim 2, wherein the exchangeable tip is formed as a sintered powder injection moulding part.

45. The drilling tool of claim 2, wherein the base body comprises tool steel or a high-speed steel.

46. The drilling tool of claim 2, wherein the main cutting edges each have two cutting edges formed into the exchangeable tip, sloped against each other in a roof shape, and aligned in a generally radial direction.

47. The drilling tool of claim 46, wherein the cutting edges of the two main cutting edges are positioned in equal radial distances from a drill axis, forming a double cutter.

48. The drilling tool of claim 46, the two cutting edges of each of the main cutting edges comprising an inner cutting edge and an outer cutting edge and wherein only one of the two inner cutting edges overlaps with a drill axis.

49. The drilling tool of claim 46, wherein cutting edge corners of the cutting edges protrude radially over an outer circumference of the drill tip and merge into generally axially aligned guide edges.

50. The drilling tool of claim 49, wherein a guide rib radially protrudes over the outer circumference and extends over part of the circumference of the drill tip and adjoins the guide edge in a circumferential direction.

51. The drilling tool of claim 46, wherein a peak and outwardly protruding cutting edge corners of the two main cutting edges are positioned in equal radial distances from a drill axis.

52. The drilling tool of claim 46, the two cutting edges of the two main cutting edges comprising respective inner and outer cutting edges and wherein the outer cutting edges are of equal length and the inner cutting edges are of different length.

53. The drilling tool of claim 46, wherein the cutting edges and a plane which is perpendicular to a drill axis include an angle of 2° to 30°.

54. The drilling tool of claim 46, wherein the cutting edges are wave-shaped.

55. The drilling tool of claim 46, wherein indentations, raised portions, steps, or ribs, which reach the cutting edges, are formed into the cutting faces.

56. The drilling tool of claim 46, wherein chip forming hollows are formed into the cutting faces positioned at an axial distance with respect to the cutting edges.

57. The drilling tool of claim 56, wherein the chip forming hollows have sides corresponding in shape to the roof-shape of the cutting edges at least at sides adjoining the cutting edges.

58. The drilling tool of claim 2, wherein the coupling piece includes an anchoring pin protruding centrally over the exchangeable tip and insertable into the base body for anchoring therein, wherein the coupling piece has an end face protruding generally radially over the anchoring pin, the end face being pressable against a bottom face delimiting the bushing.

* * * * *